April 3, 1934.  H. C. DE VRY  1,953,291
COFFEE URN
Filed May 16, 1932  3 Sheets-Sheet 1

INVENTOR
HARRY C. DEVRY
BY
Cook & Robinson
ATTORNEYS

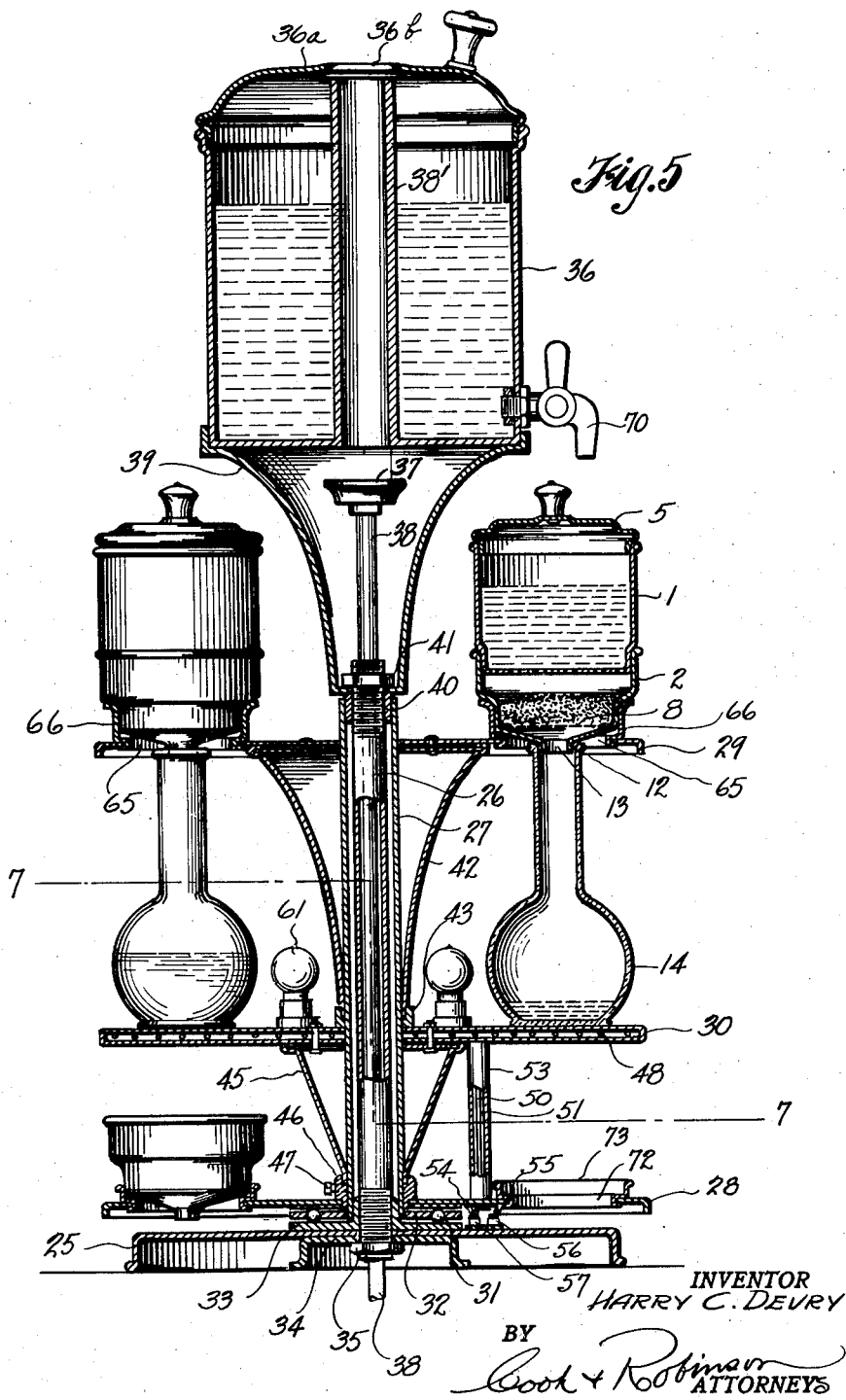

April 3, 1934.  H. C. DE VRY  1,953,291
COFFEE URN
Filed May 16, 1932   3 Sheets-Sheet 3
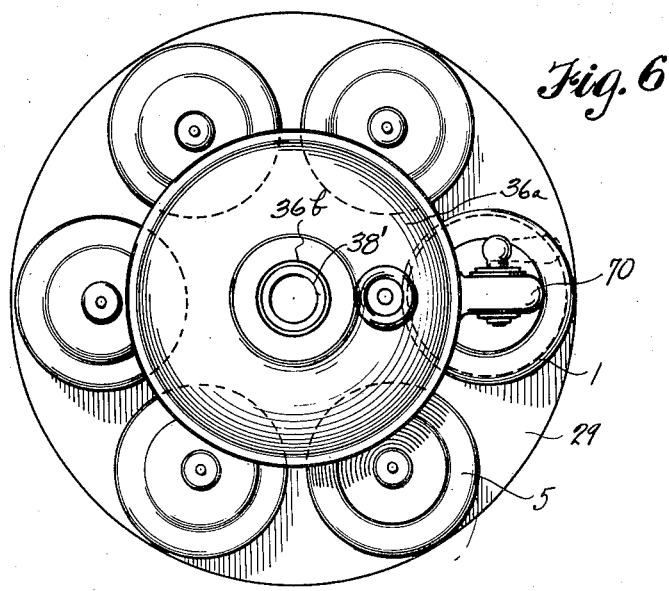
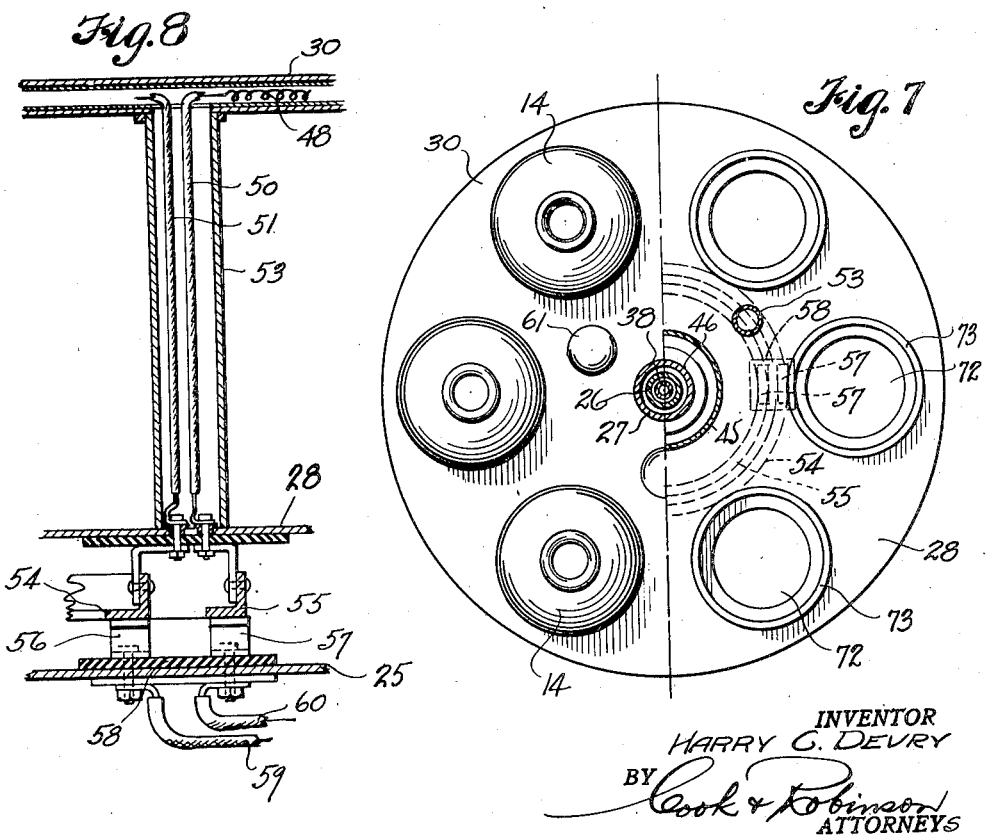
INVENTOR
HARRY C. DEVRY
BY Cook & Robinson
ATTORNEYS Patented Apr. 3, 1934

1,953,291

UNITED STATES PATENT OFFICE 1,953,291

COFFEE URN

Harry C. de Vry, Seattle, Wash.

Application May 16, 1932, Serial No. 611,529

3 Claims. (Cl. 53—3)

This invention relates to improvements in coffee making devices and it has reference more particularly to devices of that character for making what is known as "drip coffee", and which are adapted either for table or for counter use.

It is the principal object of this invention to provide coffee making devices of the above character either as single or as plural unit devices, and in which the coffee, as it is made, drips into receptacles of novel form from which it may be served and which are easily and readily removable from the device for this purpose.

It is also an object of the invention to provide improvements in devices of this character especially with reference to the details of the receptacle which holds the ground coffee and from which the coffee drains into the serving receptacle; also with respect to the provision of a removable, perforated disk serving to support the ground coffee and through which the coffee drips.

Still another object of the invention resides in the provision, in the single unit device, of a partly enclosed housing for the coffee receptacle whereby its heat is retained to an extent which prevents it cooling before being served.

Still another object of the invention resides in the provision of a coffee making urn especially designed for restaurant or hotel use, embodying a plurality of units and wherein there is a centrally located tank for supplying hot water to the several units which are mounted for rotation thereabout; also wherein there is an electrically heated plate or table on which the coffee serving and receiving bottles are supported.

Other objects of the invention reside in the details of construction and in the combination of the various parts and in their manner of use, as will hereinafter be fully described.

In accomplishing these and other objects of the invention, I have provided the improved details of construction, preferred forms of which are illustrated in the accompanying drawings wherein—

Figure 5 is a central sectional view of a coffee urn embodied by the present invention.

Figure 6 is a top view of the urn.

Figure 7 is a horizontal sectional view, taken on the line 7—7 in Figure 5.

Figure 8 is a sectional detail showing the electrical connections leading to the heated table in the device of Figure 5.

Explanatory to the present invention, it will here be stated that heretofore it has been the usual practice in serving coffee to fill the coffee cups directly from the coffee making device and then to carry the cups to the table. This was a slow method of serving, especially for restaurants and like places. Moreover, the ordinary type of coffee making urn is not satisfactory because it requires frequent boiling out or cleaning in order to prevent the coffee from becoming strong and distasteful and to keep it in a sanitary condition. Much care and attention necessarily is required in the making of coffee in the usual type of urn and in keeping the urn in usable or working condition. The present invention has for its object, therefore, to overcome the undesirable features inherent in the usual coffee making device and to facilitate the serving of coffee therefrom. It provides for serving the coffee to the cups on the table, as distinguished from carrying the filled cups from the urn to the table. It also provides for making coffee without boiling and for then maintaining it in a properly heated condition.

Referring more in detail to the drawings—

Figure 1:
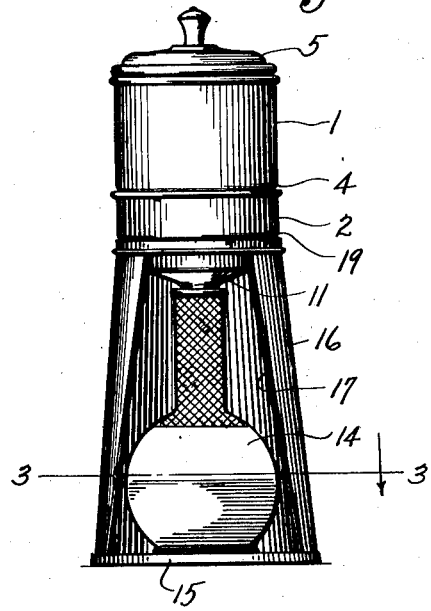
Figure 1 is a front elevation of a coffee making device embodying the present invention.
Figure 2:
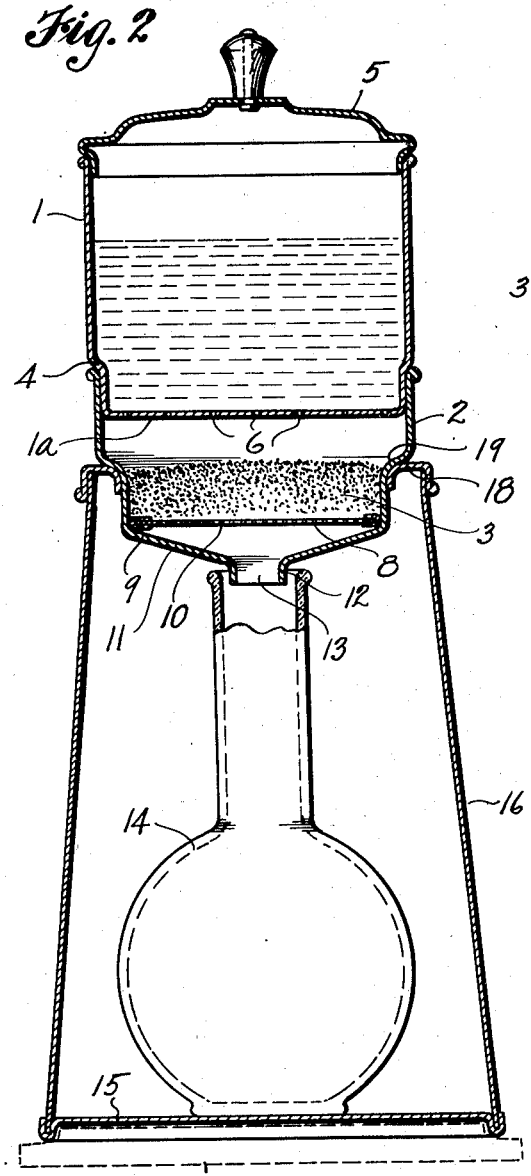
Figure 2 is a central vertical section of the same.
Figure 3:
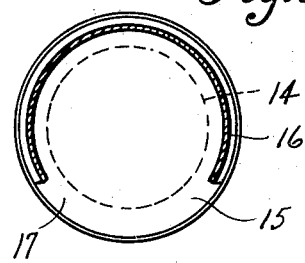
Figure 3 is a horizontal, sectional view taken on the line 3—3 of Figure 1.
Figure 4:
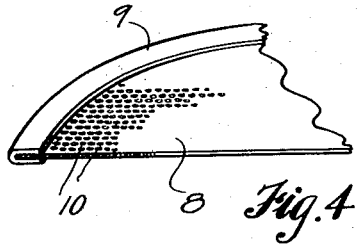
Figure 4 is an enlarged view of a portion of the perforated drip disk used in the device.

First with reference to the device of Figures 1 and 2, 1 designates a cylindrical pot or container for hot water. This is removably and snugly seated within the open upper end of a smaller cuplike receptacle 2 in which ground coffee, as designated at 3, is placed. The container 1 is limited in the extent to which it may enter the mouth of receptacle 2 by reason of an annular shoulder 4 that is formed outwardly about it at a definitely spaced distance above its lower end. A cover 5 is removably fitted to the container 1 and the bottom wall 1a of the container is provided with a suitable number of small perforations 6 through which the hot water may drip onto the ground coffee in the cup 2 which is supported by a disk 8 that is removably fitted within the base of the cup and which has an edge binding strip 9 which seats snugly within the bend of the cup and against the bottom wall 11 thereof in a liquid-tight joint. The disk is very closely covered with small perforations 10 through which the coffee may drip into the base of the cup.

This disk is made removable in order to facilitate cleaning of the parts, as it would be difficult to clean if fixed in place.

The base, or bottom wall 11 of the cup 2 slopes downwardly toward the center and is there formed with a neck 12 providing an opening 13 through which the drip coffee drains into the serving receptacle 14, which in this instance is in the nature of a narrow necked bottle or carafe, preferably made of Pyrex to prevent its breaking by reason of the hot coffee dripping into it.

The containers 1 and 2 are supported by a base consisting of a circular bottom plate 15 upon which the receptacle 14 rests and to which is fastened an upwardly tapering conical housing 16 which encloses the receptacle 14. This has a suitable side opening 17 for the removal or replacement of the receptacle. The upper end of the housing has a cap or top plate 18 secured thereto and provided with a central, circular opening within which the lower portion of the cup 2 is removably fitted; this cup having a downwardly facing shoulder 19 formed about it which engages the edge of the opening on plate 18 to support the cup and to limit the extent to which it may enter.

In using the device, assuming it to be so constructed, the serving bottle 14 may first be placed within the housing in proper position. Then the cup 2 with the perforated disk 8 properly in place is then filled with a measured amount of ground coffee, after which the cup is properly seated in the opening in the upper end wall 18 of the housing 16. The container 1 is then fitted within the open upper end of cup 2 and a measured amount of hot water is poured into it. The hot water drips through the perforations 6 in the base or bottom wall of the container and filters through the ground coffee 3 and drips through the perforations 10 of disk 8 and is drained by the drain wall 11 through opening 13 and into the bottle. After the water has all passed through the coffee and has drained into the bottle, the latter may be removed from the housing for serving the coffee.

If it is desired, a heating element, as indicated in dotted lines at 20 in Figure 2, may be employed for keeping the coffee in heated condition. This heating element may be made within or as a part of the base of the housing, or it may be an independent unit upon which the housing might be supported.

The device illustrated in Figures 5 to 8 consists of a plurality of units of substantially the same construction as that of Figures 1 and 2. It consists of a central, circular base 25 which mounts a central, vertical standard 26 of tubular form, and about which a sleeve 27 is rotatable. This sleeve mounts a circular disk or table 28 about its lower end, also a similar table or disk 29 at its upper end and a table 30 intermediate its ends; the three tables 28, 29 and 30 being coaxial of the standard and in parallel planes perpendicular thereto. These parts are freely rotatable as a unit about the standard and the unit is supported upon anti-friction ball bearings 31 contained in a cage 32 that is located between the base 25 and bottom disk 28. As seen in Figure 5, the tubular standard 26 is threaded at its lower end and the base disk is rigidly clamped between a bearing disk 33 on the top side and a support 34 on its under side against which a nut 35 is clamped.

Mounted upon the upper end of standard 26 is a tank 36 for water, and this may be heated by flame from a gas burner 37 located beneath it. Gas may be supplied to the burner through a pipe 38 extended upwardly within the tubular standard and a vent pipe 38' for the burner extends up through the tank. The cover 36a for the tank has an opening 36b registering with the upper end of pipe 38'.

As here shown, the tank is removably supported in a base or shell 39 secured to the upper end of pipe 26 between lock nuts 40 and 41, and the nut 40 serves as a spacing bushing about which the upper end of sleeve 27 revolves. Also there is a downwardly tapered conical shell 42 resting at its lower end in a nut 43 against table 30 as a support for the upper table 29, and a similar shell 45 fixed in a nut 46 fixed by a set screw 47 to the shaft adjacent the lower disk or table 28 supports the central table.

The central table is heated by internally contained heating coil 48 having circuit wires 50 and 51 leading therefrom downwardly through a pipe 53 through the bottom disk 28 where they connect with contact rings 54 and 55 mounted concentrically thereon. Brushes 56 and 57 are mounted on an insulating block 58 on the base 25 and circuit wires 59—60 lead to these brushes from a source of electricity. The brushes and contact rings provide for rotating the table 30 without destroying the flow of current to the heating element and the element keeps the table 30 heated to a suitable degree for keeping the coffee receptacles hot.

Electric lamps, as at 61, also are mounted on the table 30 and are connected in the heating element circuit for illuminating the urn.

In this instance the urn accommodates six units which are equally spaced circularly about it. Each unit comprises parts like those of the the single unit device of Figs. 1 and 2, that is, each has a water container 1 removably fitted in the upper end of a container 2 in which the ground coffee is contained and supported upon a removable, perforated disk 8. For each unit there is a coffee serving receptacle 14 into which the coffee from the base opening 13 of cup 2 drains and the bottles are kept heated by resting upon the electrically heated table 30.

The table 29, in the urn, is provided with openings, as at 65, arranged at equally spaced angular intervals about the standard and in these openings annular upstanding flanges 66 are secured and within which the cups 2 are removably seated in the same manner as the cup 2 is seated within the top opening of the cap 18 in the device of Figure 1.

The tank 36 has a faucet 70 at one side and the units may be brought, by rotation of the support, into position for filling the containers 1 from the faucet.

In the bottom disk 28, there are openings 72 arranged in alinement with those of disk 29 and these are likewise fitted with flanged sleeves 73 within which cups 2 may be placed ready for use as replacements for those of the units above.

Assuming that the urn is so arranged, it is used as follows: The ground coffee is first placed in the various cups 2, and these placed in position in the several openings of the disk or table 29. Then the bottles are placed in position to receive the coffee as it drains from the cup openings. Then the pots or containers 1 are applied to the cups 2 and they may be filled as needed from the tank 36 as they are rotated to a position beneath the faucet. For convenience, the extra cups 2 are held in readiness on the disk 28 and when coffee is all used from one of the bottles, that unit may be recharged by taking the cup 2 of used coffee from the unit and replacing it with the fresh supply cup from disk 28.

With units of this character, as used in the single or in the plural unit device, the coffee is properly made without boiling. The bottle provides an easy and convenient means for serving the coffee on the table and eliminates the necessity of carrying the cups from the device to the table.

One of the special advantages of the device of Figure 1 is that if desired it may be placed directly on the table and coffee served therefrom as needed. The enclosed housing 16 within which the container 14 is placed retains the heat of the coffee for considerable time. If a heating element of the character disclosed is employed with this device the coffee may be kept very hot as long as desired.

The advantage of the device of Figure 5 is that for restaurant use a supply of fresh coffee is quickly provided, it being understood that all of the units need not be filled with hot water at the same time, but only filled as they are needed. The heated table 30 keeps the bottles of coffee hot at all times. The convenience afforded by this device resides in the fact that a bottle may be carried to the table and several persons served therefrom, as distinguished from the old method of the waiter carrying the cups from the urn to the table. Such devices may be made of an ornamental and artistic nature, with as many units as practical.

Having thus described my invention, what I claim as new therein and desire to secure by Letters Patent is:

1. A coffee urn comprising a base, a vertical standard fixed thereto, a water tank mounted on the standard, means for heating the tank, a faucet for drawing water from the tank, a carrier rotatable about the standard and comprising vertically spaced disks; said upper disks having openings therein; a plurality of coffee making devices mounted by said upper disk, each comprising a coffee cup removably fitted in one of the disk openings and having a bottom wall sloped to a central drainage opening, a perforated disk fitted removably in the cup above the base as a support for the ground coffee, a water pot removably fitted in the cup and adapted to be filled from said water tank faucet, and a serving receptacle supported on a lower disk of the carrier to receive coffee drained from the cup; said receptacle being independent of and removable from the disk for serving the coffee therefrom.

2. A coffee urn comprising a vertical standard, a hot water tank mounted on the standard and having a discharge faucet, a carrier rotatable about the standard and comprising upper and lower vertically spaced supports encircling the standard, a plurality of coffee making devices mounted by the upper supports to be filled from the faucet, each having a drainage opening, and serving vessels mounted removably on the lower support and each having a receiving opening in registration with the drainage opening of one of the coffee making devices.

3. A coffee making urn comprising a base, a vertical standard on the base, a tank for hot water mounted on the standard and having a discharge faucet, a carrier rotatable about the standard and comprising upper and lower vertically spaced supports encircling the standard, a plurality of coffee making devices mounted in spaced relation on the upper support, each to be moved by rotation of the carrier to a position to receive water from the faucet and each having a drainage port in its base, and serving vessels mounted on the lower support below the coffee making devices and having receiving openings registering with the drainage ports of the coffee making devices; said coffee making devices and said receiving vessels being removable from their supports and interchangeable in position on their respective supports.

HARRY C. DE VRY.